United States Patent [19]

Selestam et al.

[11] Patent Number: 4,534,705
[45] Date of Patent: Aug. 13, 1985

[54] HORIZONTAL-SHAFT WIND TURBINE WITH FEW BLADES

[76] Inventors: Rune K. Selestam, P.O. Box 2947 b, Kungsbacka; Ingemar K. Nygren, Kevingeringen 21, Danderyd, both of Sweden

[21] Appl. No.: 460,025

[22] Filed: Jan. 21, 1983

[51] Int. Cl.³ .............................................. F03D 7/02
[52] U.S. Cl. ...................................... 416/162; 416/11; 416/168 A
[58] Field of Search ................. 416/41 A, 162, 168 R, 416/11, 154, 164, 168 A

[56] References Cited

U.S. PATENT DOCUMENTS

| | | | |
|---|---|---|---|
| 1,990,814 | 2/1935 | Castro | 416/156 X |
| 2,655,604 | 10/1953 | Hütter | 416/11 X |
| 2,832,895 | 4/1958 | Hütter | 416/41 A X |
| 3,056,457 | 10/1962 | MacFarland | 416/166 X |
| 3,869,221 | 3/1975 | Wildner | 416/162 X |
| 3,873,236 | 3/1975 | Gall | 416/162 |
| 4,201,514 | 5/1980 | Huetter | 416/11 X |
| 4,329,117 | 5/1982 | Doman | 416/11 X |
| 4,352,634 | 10/1982 | Andrews | 416/154 |
| 4,362,467 | 12/1982 | Elliott | 416/162 X |

FOREIGN PATENT DOCUMENTS

| | | | |
|---|---|---|---|
| 2825061 | 12/1979 | Fed. Rep. of Germany | 416/11 |
| 1104473 | 11/1955 | France | 416/157 R |
| 1350013 | 12/1963 | France | 416/162 |
| 1402883 | 5/1965 | France | 416/162 |
| 2313576 | 12/1976 | France | 416/41 A |
| 580580 | 8/1958 | Italy | 416/156 |
| 129799 | 10/1981 | Japan | 416/155 |
| 148073 | 9/1982 | Japan | 416/167 |
| 8002333 | 10/1980 | Netherlands | 416/41 A |
| 1406834 | 9/1975 | United Kingdom | 416/156 |

Primary Examiner—Everette A. Powell, Jr.
Attorney, Agent, or Firm—Kenyon & Kenyon

[57] ABSTRACT

A horizontal shaft wind turbine with few blades, is provided with device for turning or twisting the blades about their longitudinal axes, comprising a power source situated outside the turbine shaft and adapted to impart axial motion to a first axially displaceable clutch mounted on the shaft, the clutch having two main parts in mutual coaction such that one part is rotationally stationary on the shaft, whereas the other part may rotate with the shaft, the part rotating with the shaft being coupled to the blades.

3 Claims, 2 Drawing Figures

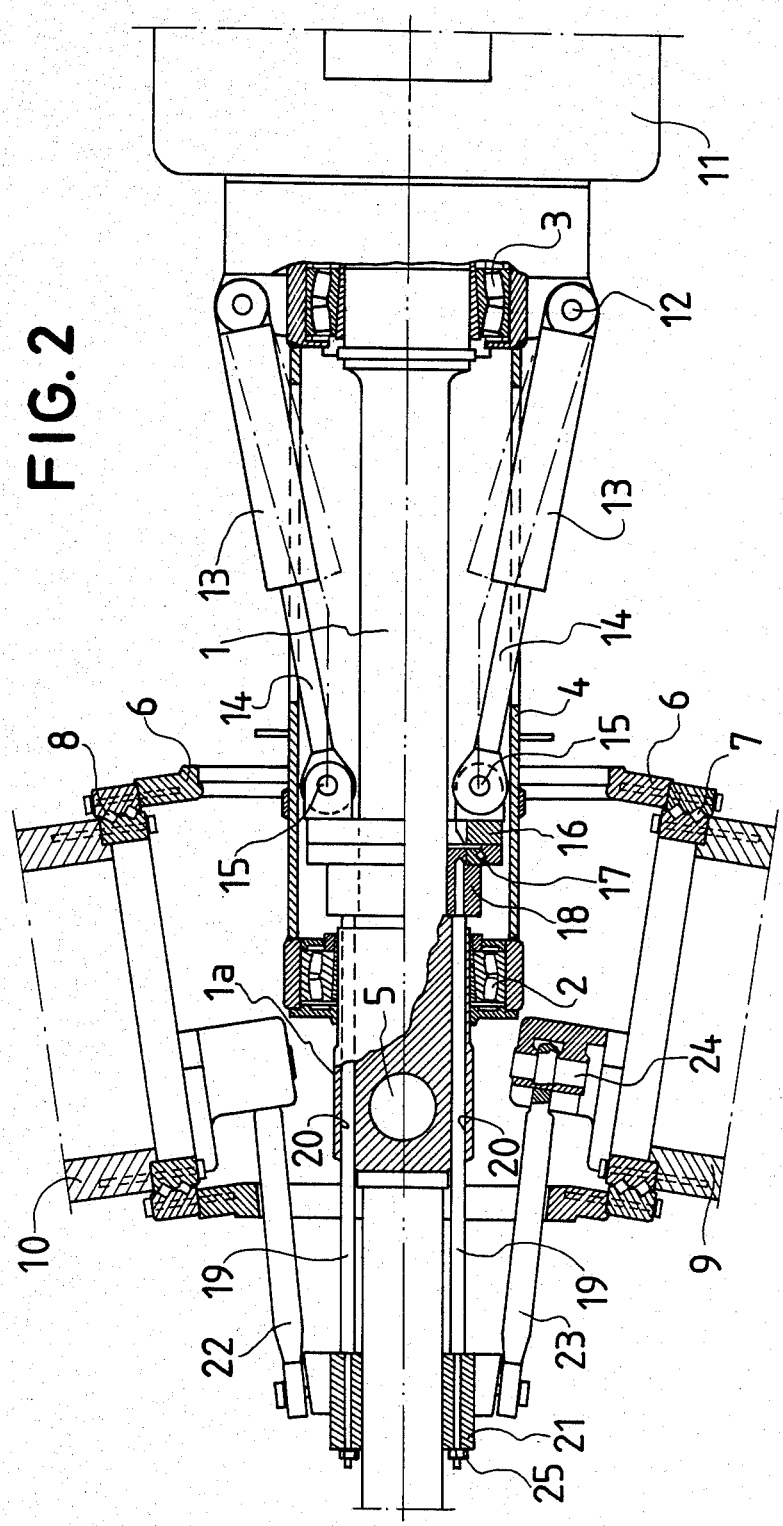

HORIZONTAL-SHAFT WIND TURBINE WITH FEW BLADES

BACKGROUND OF THE INVENTION

This invention relates to the type of wind turbine which rotates at high speed and has a horizontal shaft and few blades in general and more particularly to an improved pitch regulation drive for such a turbine.

Because of the nature of wind power, which is characterized by varying wind speeds with relatively high amplitudes, wind power stations must be equipped with means for limiting variations in power and for limiting the force on the blades to moderate values.

In large wind power stations, at least, this limiting is provided by making the turbine blades such that they can twist about their longitudinal axes, so that the angle of twist or pitch angle may be varied to suit variations in wind speed.

For such stations known in the art, pitch regulation is generally accomplished by an electronic-hydraulic system, where the required motive power is obtained from hydraulic cylinders placed in the rotating turbine hub. This location of the hydraulic cylinders creates severe technical problems. These problems are allied to the fact that the whole of the hydraulic system, including cylinders, valves and accummulators, rotates with the turbine and must be connected to the stationary system via means permitting such rotation.

Considerable difficulties also occur in inspection and maintenance, since it is difficult to provide access to the hub of the turbine in a wind power stations.

For these reasons, several other solutions have been proposed and tried. One object here has been to have the motive power required for twisting the turbine blades provided by a power source having a more protected and accessible position inside the plant.

A simple and reliable structure is also an object, since such plant is usually unmanned and remotely controlled.

Solutions proposed so far have not satisfied these demands, however, and have furthermore involved other drawbacks, such as considerably increased length of machinery, and they have therefore not inspired any confidence in their reliability.

It is thus the object of the present invention to provide a solution to this problem.

SUMMARY OF THE INVENTION

These drawbacks and deficiencies have been surmounted, and the objects mentioned above are attained by the present invention. To accomplish this the wind turbine is provided with a device for turning or twisting the blades about their longitudinal axes, comprising a power source situated outside the turbine shaft and adapted to impart axial motion to axially dislaceable actuation means mounted on the shaft, the actuation means having two main parts in mutual coaction such that one part is rotationally stationary on the shaft, whereas the other part may rotate with the shaft. The part which rotates with the shaft is then coupled to the blades.

BRIEF DESCRIPTION OF THE DRAWING

FIG. 2 is a section to a larger scale through part A in FIG. 1.

DETAILED DESCRIPTION

Figure 1:
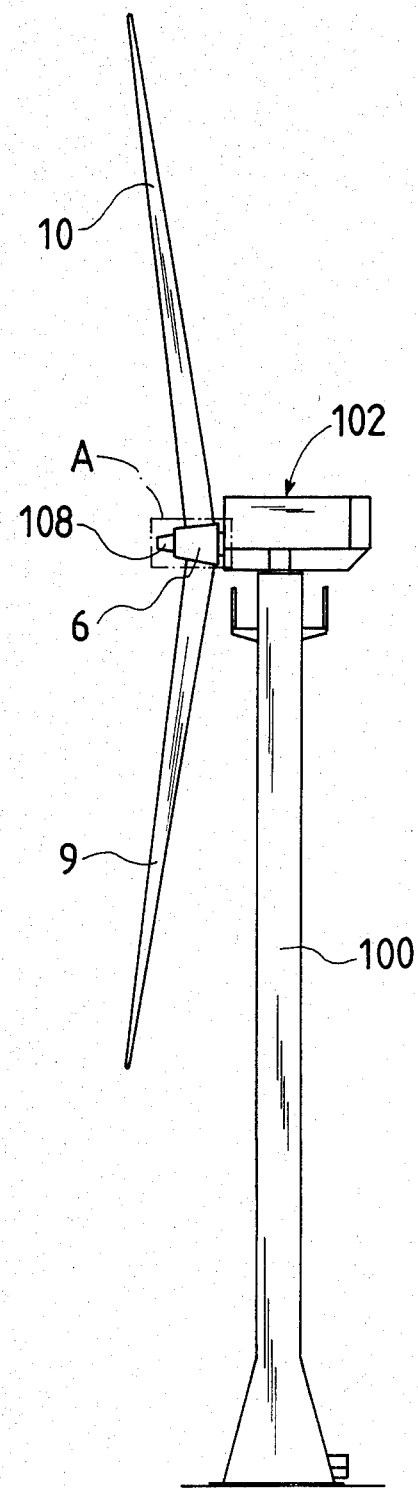
FIG. 1 is a side view of a wind power station.

FIG. 1 illustrates a tower 100, atop which is mounted a wind turbine 102 with a pair of blades 9 and 10 extending from a hub 6. Within the hub and extending back therefrom is a turbine shaft 1 rotatable about an axis 108. This shaft is illustrated in more detail in FIG. 2 which is a section through part A of FIG. 1.

Turbine shaft 1 is rotatably mounted on rolling bearings in a housing 4. The shaft 1 is provided at its outer portion with a radial through bore for a shaft 5, constituting the pivotal center for hub 6. Turbine blades 9 and 10 are supported on the hub 6 through rolling bearings 7 and 8. The bearing housing 4 also carries a gearbox 11. The turbine shaft 1 constitutes the input shaft to gearbox 11, the output shaft thereof being connected to a generator (not illustrated). Fluid actuated cylinders e.g., hydraulic cylinders 13 are pivotably mounted to the housing 4 via pins 12. The piston rods 14 of cylinders 13 are pivotably mounted to a actuation means axially displaceably mounted on shaft 1 comprising a collar 16 and guide ring 18. Mounting is via pins 15 on collar 16, which coacts with guide ring 18, via a rolling bearing 17, such that collar 16 remains rotationally stationary while guide ring 18 may rotate with shaft 1. Rods 19 are provided and are rigidly connected to ring 18. Rods 19 are guided in bushings 20 placed within apertures in shaft 1 under the rolling bearing 2. This permits rods 19 to pass beneath the bearing 2. There may be two or more rods 19, the rods being uniformly spaced around the shaft 1. A collar 21, axially displaceable on the shaft 1, is provided with holes of a diameter suited to, and in register with, the ends of rods 19. The ends of rods 19 have a reduced diameter and are threaded. Collar 2 is fitted over the ends of the rods and rigidly attached to them with the aid of nuts 25. Links 22 and 23 are pivotably attached to the collar 21, the other ends of the links being pivotably attached to the turbine blades 9 and 10 via a journalling pin 24, placed eccentrically in relation to the longitudinal axis of the respective blade.

When the hydraulic cylinders 13 are pressurized, there is an axial repositioning of the piston rods 14 carrying along collar 16 and guide ring 18, thus also repositioning rods 19, collar 21 and links 22 and 23. This then causes the blades 9 and 10 to twist about their longitudinal axes. Thus, through proper control of cylinders 18, which remain fixed, the blade pitch can be adjusted.

FIG. 2 illustrates the invention applied to a know hub structure, a so-called see-saw hub, which features the turbine blades pivotably mounted on a shaft 5 extending between the hub and turbine shaft.

However, the invention is also applicable to turbine structures with so-called rigid hubs, or in turbines where each blade is attached to the hub in an articulated manner.

In the figures, the twisting movement of the blades is accomplished using hydraulic cylinders as a power source. The number of coacting cylinders may be one or more. However, other types of power sources such as pneumatic or electromechanical drives, e.g., an electric motor and rack and pinion drive, may be used.

We claim:

1. In a horizontal shaft wind turbine with few blades, and including a shaft driven by said blades at high speed, a tubular housing having first and second bearings disposed at opposite ends thereof supporting said shaft, and a device for rotating the turbine blades about their chief axes, comprising:

(a) actuation means located within said housing, between said first and second bearings, enclosing part of said shaft and axially displaceably mounted thereon, said actuation means having first and second halves, said first half secured against rotation on said shaft and said second half rotatable with respect to said shaft;
(b) a power source fixedly disposed outside the turbine shaft and coupled to said second half;
(c) bearing means interconnecting said first and second halves axially while permitting rotational movement therebetween whereby said power source can move said second half to impart axial motion to said actuation means;
(d) a diametrically enlarged portion at said shaft for carrying said first bearing;
(e) a collar axially displaceable on said shaft outside said housing;
(f) links connecting said collar to said turbine blades;
(g) rods coupled between said first half of said actuation means and said collar to transfer the axial motion to said collar; and
(h) said diametrically enlarged shaft portion carrying said first bearing located between said collar and said actuation means having formed therein axial bores, said rods passing through said bores.

2. A device according to claim 1, wherein said power source comprises at least one fluid pressure actuated piston cylinder arrangement, said arrangement mounted adjacent said second bearing at the end of said housing remote from said turbine blades, said tubular housing including a slot for permitting the introduction into said housing of said at least one piston cylinder arrangement and its coupling to said actuation means.

3. A device as claimed in claim 1, wherein the other bearing in said housing is also mounted on a diametric enlarged portion of said shaft.

* * * * *